(12) United States Patent
Kunau

(10) Patent No.: US 8,740,232 B2
(45) Date of Patent: Jun. 3, 2014

(54) OFFSET INCLINED SUSPENSION

(71) Applicant: Daniel Kunau, Boone, CO (US)

(72) Inventor: Daniel Kunau, Boone, CO (US)

( * ) Notice: Subject to any disclaimer, the term of this patent is extended or adjusted under 35 U.S.C. 154(b) by 0 days.

(21) Appl. No.: 13/995,367

(22) PCT Filed: Dec. 24, 2012

(86) PCT No.: PCT/US2012/071584
§ 371 (c)(1),
(2), (4) Date: Jul. 1, 2013

(87) PCT Pub. No.: WO2013/115922
PCT Pub. Date: Aug. 8, 2013

(65) Prior Publication Data
US 2014/0049018 A1    Feb. 20, 2014

Related U.S. Application Data

(60) Provisional application No. 61/594,509, filed on Feb. 3, 2012.

(51) Int. Cl.
*B60G 3/18*    (2006.01)

(52) U.S. Cl.
USPC .................................................. 280/124.135

(58) Field of Classification Search
USPC ................ 280/124.135, 124.134, 124.136, 280/124.138, 93.51, 93.512, 86.751, 280/86.754, 86.756
See application file for complete search history.

(56) References Cited

U.S. PATENT DOCUMENTS

| 2,900,196 | A | 8/1959 | Nienke |
| 3,883,152 | A | 5/1975 | de Carbon |
| 4,756,517 | A | 7/1988 | Kakimoto |
| 4,941,677 | A | 7/1990 | Matsumoto et al. |
| 5,009,447 | A | 4/1991 | Gabel |
| 5,507,510 | A | 4/1996 | Kami et al. |
| 7,694,983 | B2 | 4/2010 | Griffiths |
| 7,862,060 | B2 | 1/2011 | Kageyama |
| 7,914,021 | B2 | 3/2011 | Whitacre et al. |
| 2005/0280241 | A1* | 12/2005 | Bordini ................ 280/124.135 |
| 2006/0208447 | A1* | 9/2006 | Eshelman et al. ..... 280/124.135 |

FOREIGN PATENT DOCUMENTS

| EA | 001082 B1 | 10/2000 |
| JP | 8225009 A | 9/1996 |
| JP | 2006182174 A | 7/2006 |

OTHER PUBLICATIONS

Zapletal, E., The Steer-Axis, Sep. 2002, Excerpt from http://www.race-dezert.com/forum/showthread. php/71052-Help-with-Ackerman-How-to-avoid-reverse-ackerman/page3, retrieved on Jun. 8, 2011.
Deo, H et al., Axiomatic Design of Automobile Suspension and Steering Systems: Proposal for a novel six-bar suspension, SAE Technical Paper 2004-01-0811, Mar. 8, 2004, http://web.mit.edu/pccs/pub/2004/deo-automotive-1.pdf retrieved on Jun. 7, 2011.
Rowley, W., Chapter 6—Independent Suspension: A Kinematic Overview, An Introduction to Race Car Engineering, 2003, Rowley Race Dynamics, http://www.rowleyrace.com/PDF/Chapter_6_Excerpt.pdf retrieved on Jun. 8, 2011.
ISA/RU, Written Opinion of the International Searching Authority for PCT/US2012/071584, Apr. 2, 2013.
ISA/RU, International Search Report for PCT/US2012/071584, Apr. 2, 2013.

* cited by examiner

*Primary Examiner* — Faye M. Fleming
(74) *Attorney, Agent, or Firm* — Brevetto Law Group

(57) ABSTRACT

An independent suspension for a steerable wheel has a support member that is inclined so that the movement of the wheel as it travels over an obstacle includes a rearward vector. The steering spindle is positioned in such a way that it is not perpendicular to the support member, but is angled to provide the desired caster angle, which may vary between embodiments.

25 Claims, 8 Drawing Sheets

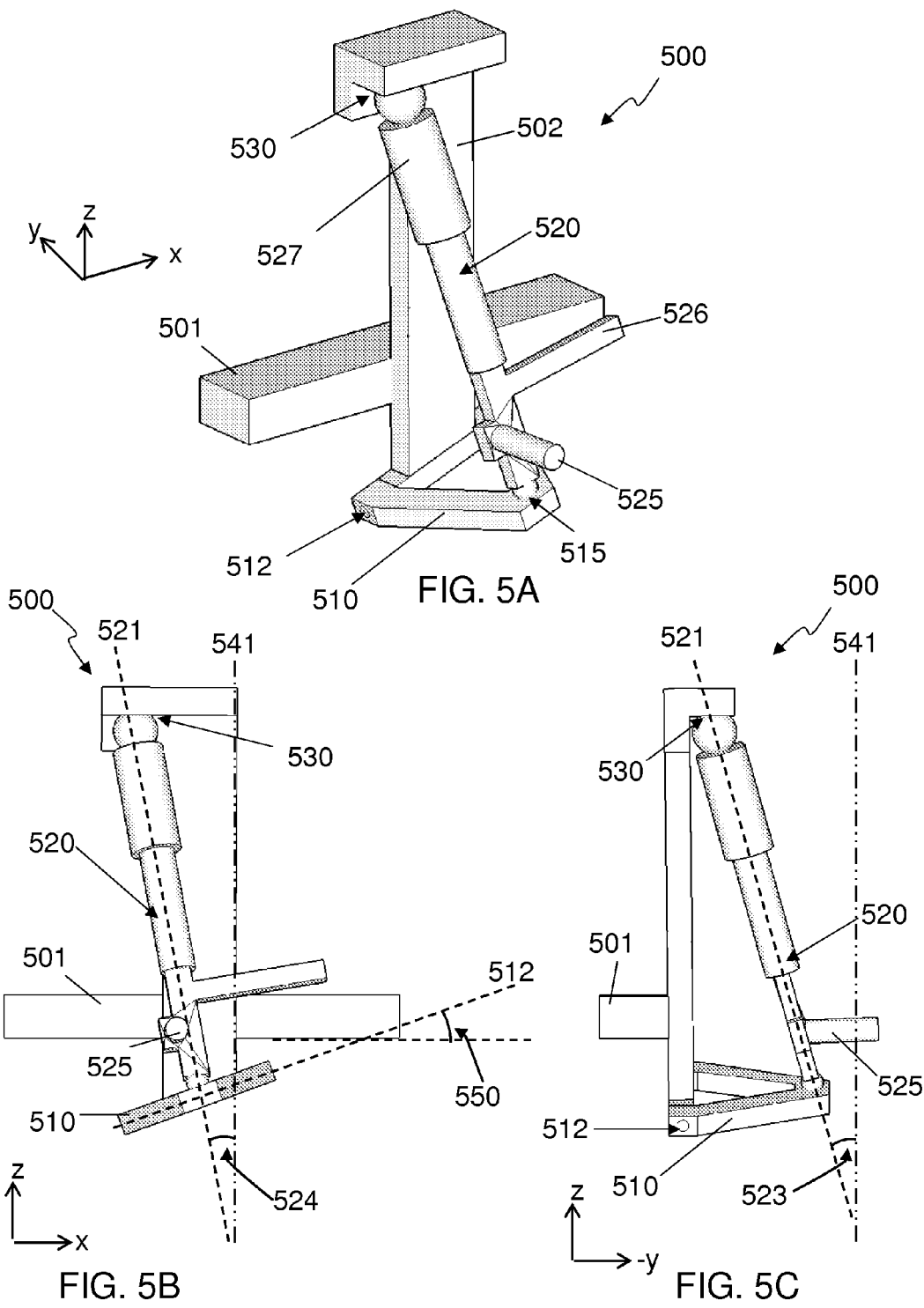

OFFSET INCLINED SUSPENSION

BACKGROUND

1. Technical Field

The present subject matter relates to an independent suspension for a wheeled vehicle.

2. Description of Related Art

While early wheeled vehicles may have had a rigid coupling of the axel to the body of the vehicle, various suspensions have been used to decouple the bumps in the road encountered by the wheels from the body of the vehicle, thereby providing a smoother ride to the vehicle's contents and/or passengers. Many early vehicles had solid axles extending from a wheel on one side of the vehicle to a wheel on the other side, even for the steering wheels. A split axle for the steering wheels began to be used almost 200 years ago. The split axle allowed for each wheel to have an independent suspension and allows for the various aspects of the steering geometry to be managed.

Some of the independent suspensions that may be in current use provide for vertical movement of the wheel as it encounters an obstruction. This type of arrangement may transmit significant forces to the vehicle that may not be absorbed by the springs and or shock absorbers of the suspension. Some suspensions may tilt the suspension to allow the movement of the wheel to have some horizontal movement as the wheel rises to go over an obstacle, but tilting the suspension may change the caster angle and therefore the handling characteristics of the vehicle.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIGS. 5A, 5B and 5C show yet another alternative embodiment of an offset inclined suspension in perspective, side, and rear views;

DETAILED DESCRIPTION

Figure 1A:
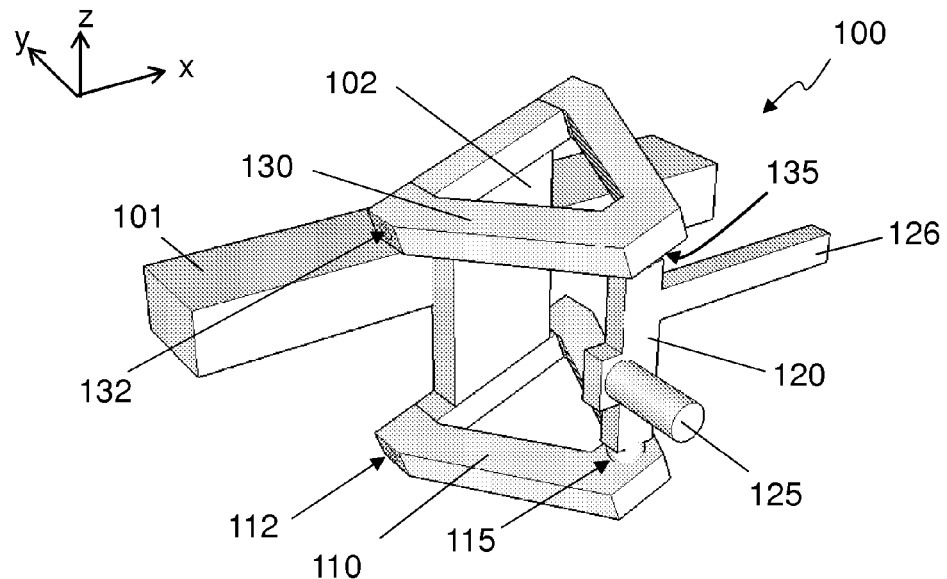
FIGS. 1A, 1B, and 1C show an embodiment of an offset inclined suspension in perspective, side, and rear views.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Directions referred to in this specification and attached claims are with respect to the associated vehicle unless otherwise noted. For example, "forward" refers to the forward direction that the vehicle would travel with the steering in a neutral position and "downward" refers to the direction that the wheels extend from the vehicle. If Cartesian coordinates are used, positive "x" refers to the forward direction, positive "y" refers to the left and positive "z" refers to upward.

"Steering axis" refers to a line in space about which a steering spindle rotates. The steering spindle may be coupled to a steerable wheel so that rotating the steering spindle about the steering axis causes the steerable wheel to turn with respect to the vehicle.

"Caster trail" refers to the linear distance in the x-dimension from a projection of the steering axis onto the ground and a line directly below the axis of the wheel's axle. "Caster angle" refers to the backwards angle of the steering axis from vertical, or to describe it in other words, the angle between the projection of the steering axis onto an x-z plane and a line parallel to the z-axis. This may be commonly referred to in the industry as positive caster.

"Kingpin offset" refers to the linear distance in the y-dimension from a projection of the steering axis onto the ground and the x-z plane that bisects the wheel. "Kingpin angle" refers to the inwards angle of the steering axis from vertical, or the angle between the projection of the steering axis onto a y-z plane and a line parallel to the z-axis.

Suspension apparatuses may be designed to control one or more suspension parameters, such as those described above, to provide particular handling characteristics for a vehicle. But in existing suspension designs, parameters may interact in such a way that independent control of the parameters may not be possible. The suspensions described herein allow for independent control of the caster angle and the direction that the wheel travels in response to encountering an obstacle.

Reference now is made in detail to the examples illustrated in the accompanying drawings and discussed below.

Figure 1B:
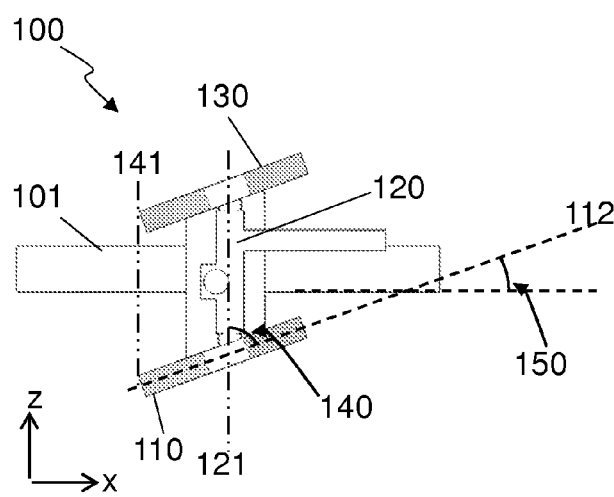
Figure 1C:
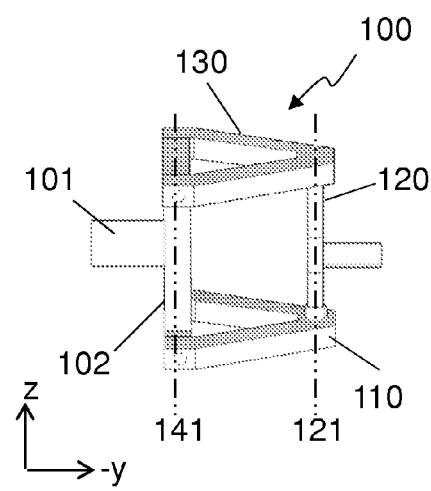
Figure 2A:
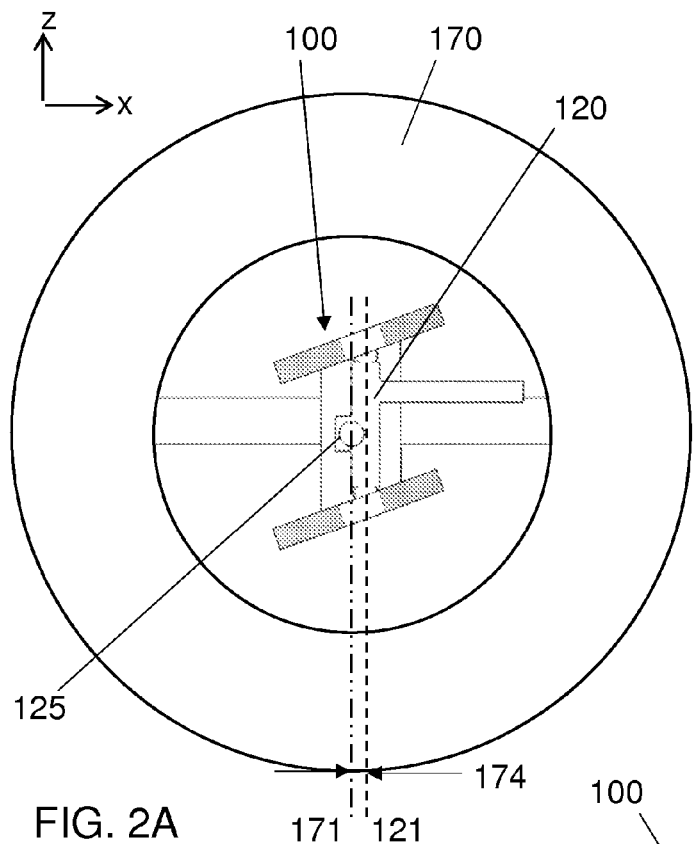
FIGS. 2A and 2B show the embodiment positioned with a tire from the side and rear.
Figure 2B:
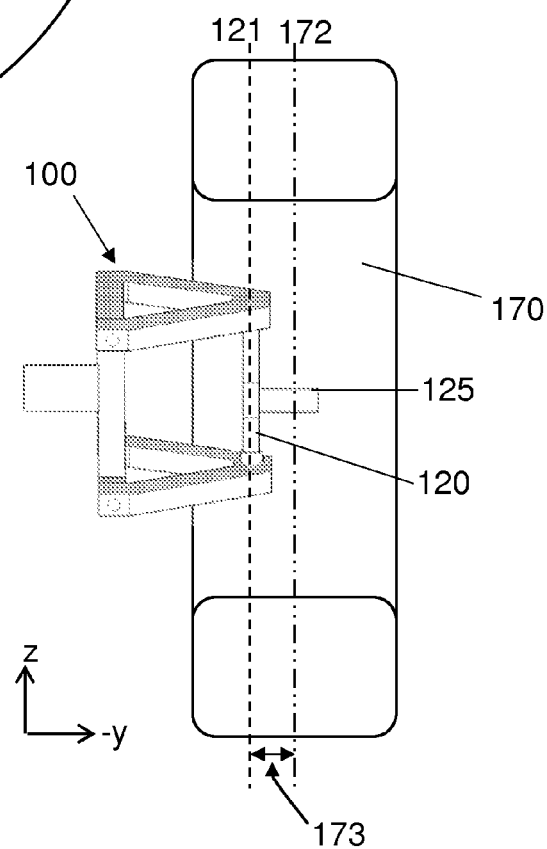

FIGS. 1A, 2B and 1C show an embodiment of an offset inclined suspension 100 in perspective, side, and rear views, respectively. The suspension 100 is shown in a neutral position and is highly simplified from an actual implementation with only the key elements shown for clarity. Such elements as springs, shock absorbers, stops, tie rods, drive train, and many other elements that may be included in an actual implementation are not shown so as not to complicate the drawing and to allow the for easier understanding of the concepts disclosed. Details of the structure of the various elements and moving joints have also been left out for simplicity. One of ordinary skill in the art may apply standard engineering analysis, techniques, and practices and standard parts such as ball-joints, bearings, universal joints, and other components, to use the disclosed concepts in an actual implementation. The wheel and tire are also omitted to allow the details of the suspension 100 to be seen.

The suspension 100 may be a part of a wheeled vehicle having a chassis 101 and may be usable for the front right wheel of the wheeled vehicle. A mirrored version of the suspension 100 may be useable for the front left wheel. The chassis 101 may be of any shape, and material and may include a frame or be constructed as a unibody, and is represented by the rectilinear beam shown. A suspension attachment 102 may be coupled to the chassis 101, although some embodiments may integrate the suspension attachment 102 with the chassis 101. A lower support member 110, which may also be referred to as a wishbone, A-arm, or control arm, is hingedly coupled to the vehicle. The hinge is provided by the suspension attachment 102 in the embodiment shown. The angle 150 of the hinge axis 112 is primarily oriented in a front-to-back position (x-axis) but is tilted downward, or inclined, so that the rear of the support member 110 is lower than the front of the support member 110.

The hinge angle 150 may be about 10 degrees or greater for embodiments. In some embodiments targeted for on-road use, the hinge angle 150 may be between about 10 degrees and about 15 degrees downward from horizontal. In other embodiments targeted for off-road use the hinge angle 150 may be between about 30 degrees and about 45 degrees downward from horizontal. Other embodiments may use any hinge angle 150 between about 10 degrees and about 45 degrees. Other embodiments may utilize a hinge angle 150 somewhat less than 10 degrees or somewhat more than 45 degrees but a hinge angle 150 outside of that range may be less effective. A hinge angle 150 much less than about 5 degrees may not provide enough backward movement for the wheel to provide much reduction in transmitted energy from the wheel as it rolls over an obstacle, and a hinge angle 150 much over about 60 degrees may not provide enough vertical movement for the wheel to create an effective suspension. In many embodiments the hinge angle 150 may lie in an x-z plane but some embodiments may have some left or right angle as well to provide some toe-in or toe-out for the suspension. Any such angle from the x-axis in the x-y plane may be included in the hinge angle 150 for various embodiments but in most embodiments, the left-right component of the hinge angle 150 may be less than about ±10 degrees.

An upper support member 130 (or wishbone, A-arm or control arm) may also be hingedly coupled to the vehicle. The hinge axis 132 of the upper support member 130 may be substantially parallel to the hinge axis 112 of the lower support member 110. In most embodiments the hinge axis 132 of the upper support member 130 may not be more than about 10 degrees off from parallel to the hinge axis 112 in any direction so that the upper support member 130 and the lower support member 110 may swing in similar arcs. The length of the lower support member 110 and the upper support member 130 may be about the same in some embodiments, although other embodiments may vary the relative length of the support members 110, 130. The two support members 110, 130 may be called about the same length if they are within the longer support member is no more than 20% longer than the shorter support member. The length of a support member 110, 130 may be thought of as the distance from the hinge axis 112, 132 to the steering axis 121 through the support member 110, 130. The position of the upper support member 130 may be substantially directly above the lower support member 110 in many embodiments so that a line 141 from the rear of the upper support member 130 to the rear of the lower support member 110 is vertical. The line 141 may be offset from vertical in some embodiments although the line 141 is vertical in the embodiment shown.

The steering spindle 120 may be coupled between the lower support member 110 using ball joint 115 and the upper support member 130 using ball joint 135 at the ends of the support members 110, 130 away from the hinges. The steering spindle 120 may include a stub axle 125 to attach a wheel to the steering spindle 120. In at least one embodiment, a ski or other type of non-rotating device may be attached to the stub axle for some types of vehicles, such as a snowmobile. The steering spindle 120 may pivot along the steering axis 121 on the ball joints 115, 135 to allow the associated wheel to be turned by moving the steering arm 126. The stub axle 125 may be positioned at a point that is not aligned with the steering axis 121, as shown in the embodiment of FIG. 1 A-C, to help create a caster trail for the wheel. Other embodiments may position the stub axle 125 aligned with the steering axis 121 or forward of the steering axis 121.

The offset angle 140 between the steering axis 121 and the hinge axis 112 of the lower support member 110 (projected on an x-z plane) may allow the caster angle of the suspension 100 to be controlled independently from the hinge angle 112. So if the steering axis 121 is not perpendicular to the hinge axis 112 (projected on an x-z plane), the suspension may be called an offset suspension. In some embodiments, where the lower support member 110 and the upper support member 130 have similar geometry, the offset angle 140 may create an offset of the two support members 110, 130 in the x-z plane, as compared to a conventional configuration where the offset angle 140 is 90 degrees. In an offset suspension, the offset angle 140 may be determined by adding 90 degrees to the desired castor angle and subtracting the hinge angle 112. In some embodiments, the offset angle 140 may be equal to the difference between the hinge angle 150 and 90 degrees, so that the steering axis 121 is vertical to provide a caster angle of 0 degrees. For example, if the hinge angle 150 is 30 degrees, the offset angle 140 may be 60 degrees to keep the steering axis vertical. In other embodiments the offset angle 140 may be any angle between about 85 degrees and the difference between the hinge angle 150 and 90 degrees. So if the hinge angle 150 is 10 degrees, the offset angle 140 may be between about 85 degrees and about 80 degrees to provide a caster angle of between 5 degrees and 0 degrees, but if the hinge angle 150 is 45 degrees, the offset angle 140 may be between about 85 degrees and about 45 degrees to provide a caster angle of between 40 degrees and 0 degrees. In at least some embodiments of an offset suspension, the caster angle may be chosen to be less than about ⅔ of the hinge angle. In some embodiments the caster angle may be a negative value with the steering axis tilted forward.

FIGS. 2A and 2B show the embodiment of the offset inclined suspension 100 positioned with a tire 170 from the side and rear, respectively. The wheel upon which the tire 170 may be mounted and which may be attached to the stub axle 125 is not shown for clarity. The tire 170 is shown in cross-section in FIG. 2B for clarity as well. The suspension 100 is shown in the same neutral position in FIGS. 2A and 2B as it was in FIG. 1A-C.

In the embodiment of the offset inclined suspension 100 shown, the steering axis 121 of the steering spindle 120 is vertical so that the caster angle and the kingpin angle are both 0 degrees. The stub axle 125 is offset from the steering axis 121 so that the vertical line 171 going through the center of the stub axle 125 is behind the steering axis 121 on the ground to create a caster trail 174 that may help return the tire 170 to a forward orientation after steering. In various embodiments the distance on the ground from the center-plane 172 of the tire 170 to the steering axis 121 may create a kingpin offset 173.

Figure 3A:
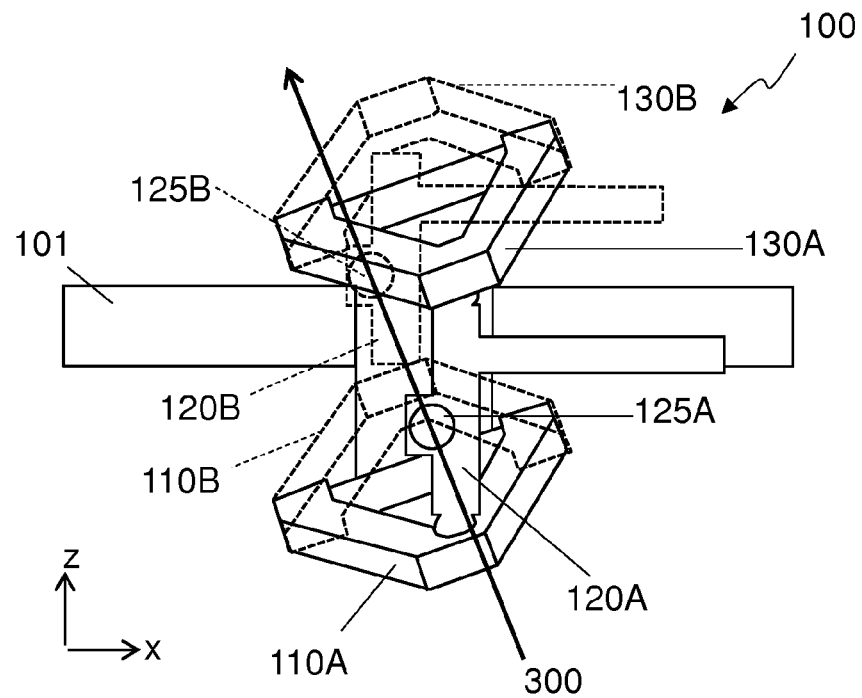
FIGS. 3A and 3B show the movement range of the embodiment from the side and rear.
Figure 3B:
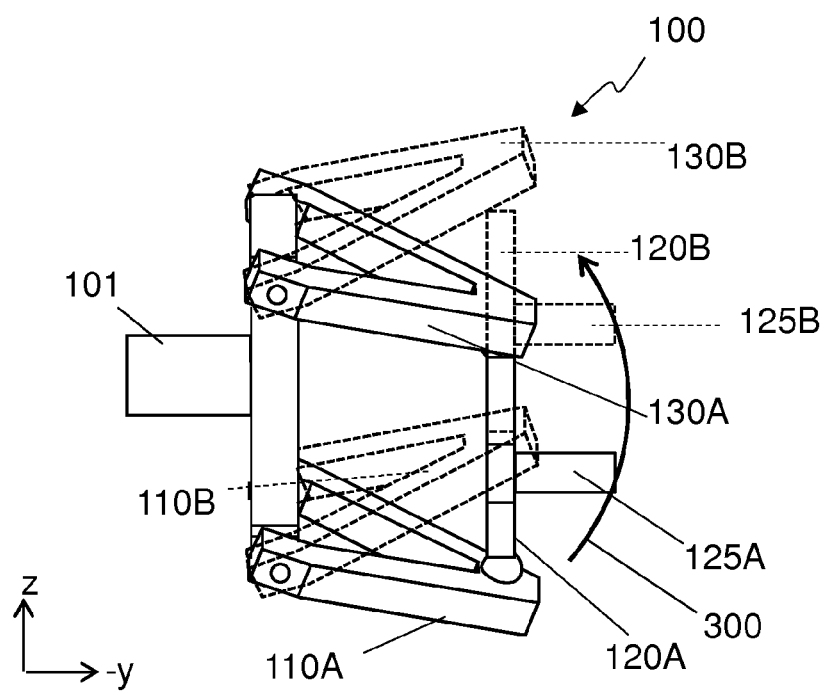

FIGS. 3A and 3B show the movement range of an embodiment of the offset inclined suspension 100 from the side and rear, respectively. The suspension 100 is shown in an extended position in solid lines and in a compressed position in broken lines. In the extended position both the lower support member 110A and the upper support member 130A are rotated down about their respective hinge axes so that the steering spindle 120A and stub axle 125A are lower and somewhat forward of the neutral position. In the compressed position, both the lower support member 110B and the upper support member 130B are rotated up about their respective hinge axes so that the steering spindle 120B and stub axle 125B are higher and somewhat to the rear of the neutral position. It may also be observed that the camber is not affected by the movement of the suspension 100.

The vector 300 shows the direction of the stub axle 125 as the suspension 100 goes from the extended position to the compressed position. The vector 300 may represent the travel of the tire as it travels over an obstacle. The angle of the vector 300 from vertical (in the x-z plane) may be about the same as the hinge angle 150 shown in FIG. 1B. The rearward component of the vector 300 may help reduce the forces transmitted from the tire to the chassis 101 as the tire travels over an obstacle. So the suspension 100 allows the angle of the suspension travel as represented by vector 300 to be different than the angle of the steering axis 121. The travel 300 of the stub axle 25 in the y-z plane may be an arc with a radius about equal to the length of the support members 110, 130. The length of the support members 110, 130 may be kept relatively long compared to the movement range of the suspension 100 to minimize side-to-side (y dimension) travel of the tire as the suspension 100 moves.

Figure 4A:
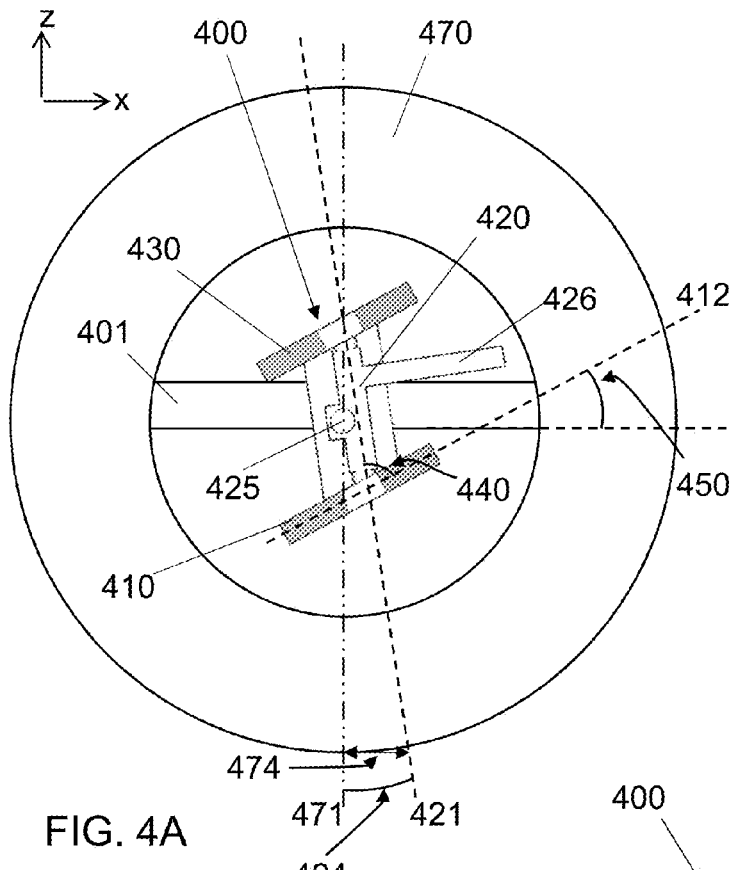
FIGS. 4A and 4B show an alternative embodiment of an offset inclined suspension positioned with a tire from the side and rear.
Figure 4B:
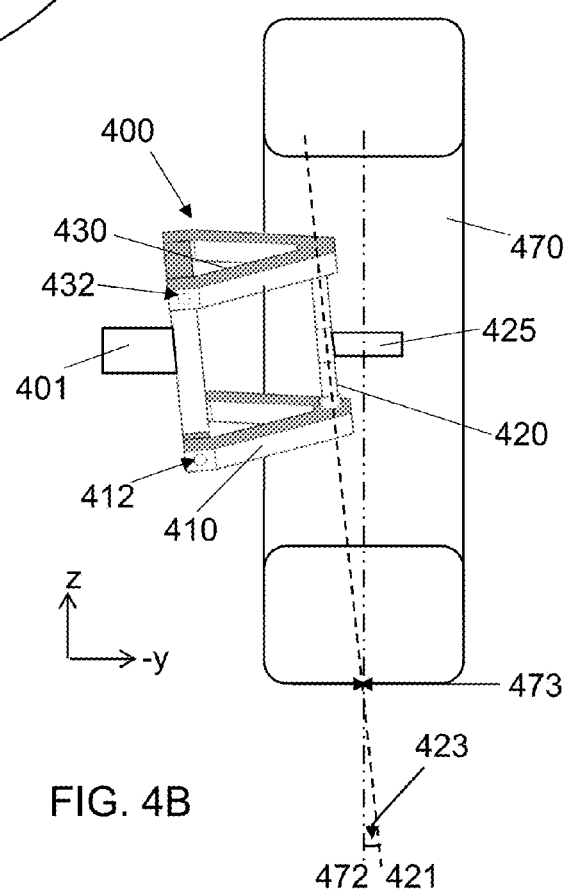

FIGS. 4A and 4B show an alternative embodiment of an offset inclined suspension 400 positioned with a tire 470 from the side and rear, respectively. The alternative embodiment of the suspension 400 differs from the embodiment of suspension 100 in that the steering axis 421 is not vertical, so the sum of the offset angle 440 and the hinge angle 450 is greater than 90 degrees. The steering axis 421 is positioned to create a caster angle 424 and a kingpin angle 423. The suspension 400 and tire 470 have a caster trail 474 and a kingpin offset 473, although the kingpin offset 473 shown is about 0 centimeters (cm) in the embodiment shown.

The suspension 400 includes a lower support member 410 hingedly coupled to the chassis 401 of the vehicle about hinge axis 412. An upper support member 430 is hingedly coupled to the chassis 401 about hinge axis 432 that is substantially parallel to the hinge axis 412. The hinge axis 412 may be tilted downward at a hinge angle 450 so that movement of the suspension may include a rearward vector as the tire 470 travels over an obstacle. A steering spindle 420 is coupled to the support members 410, 430 and may pivot about a steering axis 421. The steering spindle 420 may include a steering arm 426 and a stub axle 425 to mount a wheel (not shown) and tire 470.

The movement of the tire 470 in the x-z plane is determined by the hinge angle 450. With larger values of the hinge angle 450, more rearward movement of the tire 470 is created as the tire 470 travels over an obstacle. The angles of the steering axis 421 may be controlled independently from the hinge angle 450 by the positioning of the two support members 410, 430 and by where on those support members 410, 430 the steering spindle 420 is coupled. Various embodiments may include hinge locations for the support members 410, 430 at various locations on the chassis 401 and the shape of the support members 410, 430 may be similar or quite different in various embodiments. The length of the support members 410, 430 may be different in some embodiments so that their swinging arcs are not identical and their hinge angles may not be parallel in some embodiments.

FIGS. 5A, 5B and 5C show yet another alternative embodiment of an offset inclined suspension 500 in perspective, side, and rear views, respectively. The suspension 500 is shown in a neutral position and is highly simplified from an actual implementation with only the key elements shown for clarity. Such elements as springs, stops, tie rods, drive train, and many other elements that may be included in an actual implementation are not shown so as not to complicate the drawing and to allow the for easier understanding of the concepts disclosed. Details of the structure of the various elements and moving joints have also been left out for simplicity. One of ordinary skill in the art may apply standard engineering analysis, techniques, and practices and standard parts such as ball-joints, bearings, universal joints, and other components, to use the disclosed concepts in an actual implementation. The wheel and tire are also omitted to allow the details of the suspension 500 to be seen.

The suspension 500 may be a part of a wheeled vehicle having a chassis 501 and may be usable for the front right wheel of the wheeled vehicle. A mirrored version of the suspension 500 may be useable for the front left wheel. The chassis 501 may be of any shape, material and may include a frame, or be constructed as a unibody, and is represented by the rectilinear beam shown. A suspension attachment 502 may be coupled to the chassis 501 although some embodiments may integrate the suspension attachment 502 with the chassis 501. A lower support member 510, which may also be referred to as a wishbone, A-arm, or control arm, is hingedly coupled to the vehicle. The hinge is provided by the suspension attachment 502 in the embodiment shown. The angle 550 of the hinge axis 512 is primarily oriented in a front-to-back position (x-axis) but is tilted downward from forward, so that the rear of the support member 510 is lower than the front of the support member 510.

The hinge angle 550 may be about 10 degrees or greater. In some embodiments targeted for on-road use, the hinge angle 550 may be between about 10 degrees and about 15 degrees downward from horizontal. In other embodiments targeted for off-road use, the hinge angle 550 may be between about 30 degrees and about 45 degrees downward from horizontal. Other embodiments may use any hinge angle 550 between about 10 degrees and about 45 degrees. Other embodiments may utilize a hinge angle 550 somewhat less than 10 degrees or somewhat more than 45 degrees but a hinge angle 550 outside of that range may be less effective. A hinge angle 550 much less than about 5 degrees may not provide enough backward movement for the wheel to provide much reduction in transmitted energy from the wheel as it rolls over an obstacle, and a hinge angle 550 much over about 60 degrees may not provide enough vertical movement for the wheel to create an effective suspension. In many embodiments the hinge angle 550 may lie in an x-z plane but some embodiments may have some left or right angle as well to provide some toe-in or toe-out for the suspension. Any such angle from the x-axis in the x-y plane may be included in the hinge angle 550 for various embodiments but in most embodiments, the left-right component of the hinge angle 550 may be less than about ±10 degrees.

The steering spindle 520 may be coupled between the lower support member 510 using ball joint 515 and chassis 501 and/or suspension attachment 502 using coupling 530. The steering spindle 520 may include a stub axle 525 to attach a wheel to the steering spindle 520. The steering spindle 520 may pivot along the steering axis 521 about the ball joint 515, and coupling 530 to allow the associated wheel to be turned by moving the steering arm 526. The steering spindle 520 may include a telescoping section 527 to allow the length of the steering spindle 520 to vary as the lower support member 510 rotates about the hinge axis 512. The telescoping section 527 may include a shock absorber and/or spring in some embodiments. The steering spindle 520 with the telescoping section 527 may be referred to as a strut.

The location of the coupling 530 with respect to the lower support member 510 may allow the caster angle 524 and the kingpin angle 523 (both shown in relation to vertical line 541) to be controlled independently from the hinge angle 550. In some embodiments, the caster angle 524 may be between about 50% and about 67% of the hinge angle 550. In most embodiments, the caster angle may be between about 0 degrees and about 5 degrees less than the hinge angle 550. In some embodiments, the stub axle 525 may be offset toward the rear as shown, but other embodiments may position the stub axle 525 on the steering axis 521 and yet additional embodiments may position the stub axle 525 forward of the steering axis 521. The positioning of the stub axle 525 may allow for compensation of the caster trail that would otherwise be created by the caster angle 524.

Figure 6A:
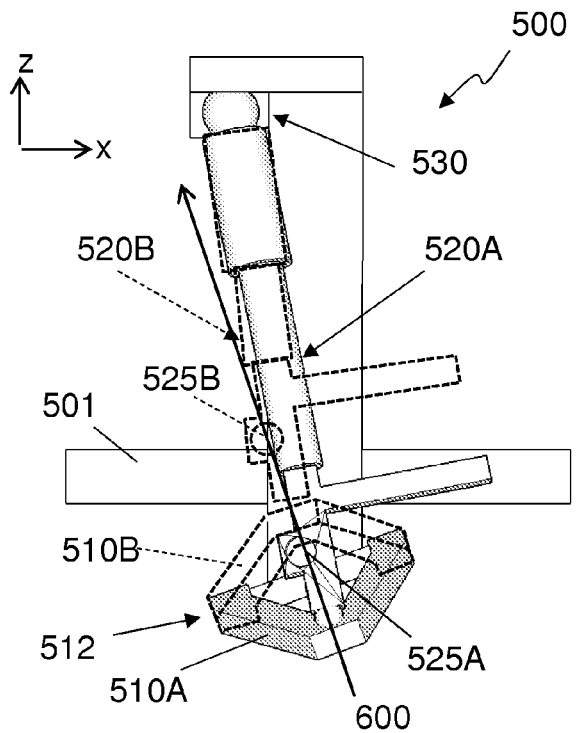
FIGS. 6A and 6B show the movement range of the other alternative embodiment from the side and rear.
Figure 6B:
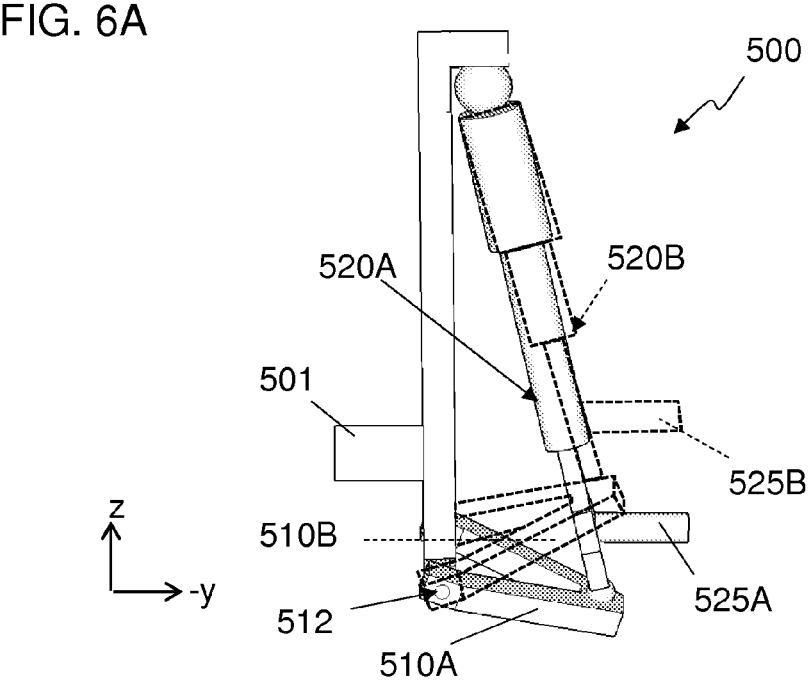

FIGS. 6A and 6B show the movement range of the other alternative embodiment of the offset inclined suspension 500 from the side and rear, respectively. The suspension 500 is shown in an extended position in solid lines and in a compressed position in broken lines. In the extended position, the lower support member 510A is rotated down about its hinge axis 512 so that the steering spindle 520A is expanded and stub axle 525A is lower and somewhat forward of the neutral position. In the compressed position, the lower support member 510B is rotated up about its respective hinge axis 512 so that the steering spindle 520B is expanded and the stub axle 125B is higher and somewhat backward from the neutral position.

The vector 600 shows the direction of the stub axle 525 as the suspension 500 goes from the extended position to the compressed position. The vector 600 may represent the travel of the tire as it travels over an obstacle. The angle of the vector 600 from vertical (in the x-z plane) may be about the same as the hinge angle 550 shown in FIG. 5B, although it may be somewhat less than the hinge angle 550 due to the fixed location of the coupling 530. The difference between the angle of vector 600 (from vertical) and the hinge angle 550 may be quite small in actual implementations as the length of the steering spindle 521 is typically quite a bit longer than the movement of the support member 510. The rearward component of the vector 600 may help reduce the forces transmitted from the tire to the chassis 501 as the tire travels over an obstacle. So the suspension 500 allows the angle of the suspension travel as represented by vector 600 to be different than the angle of the steering axis 521.

Figure 7A:
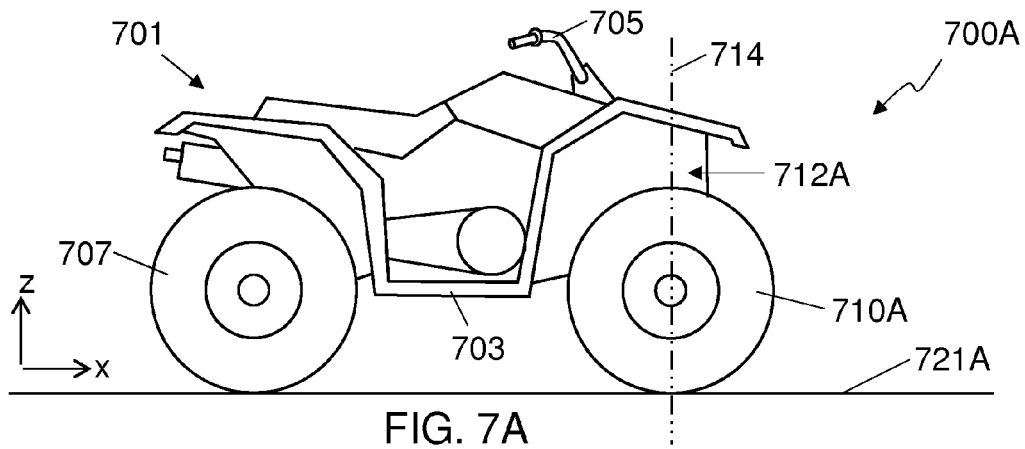
FIGS. 7A, 7B, and 7C show a wheeled vehicle with an embodiment of an offset inclined suspension on level ground, rolling over a hole, and rolling over an bump, respectively.
Figure 7B:
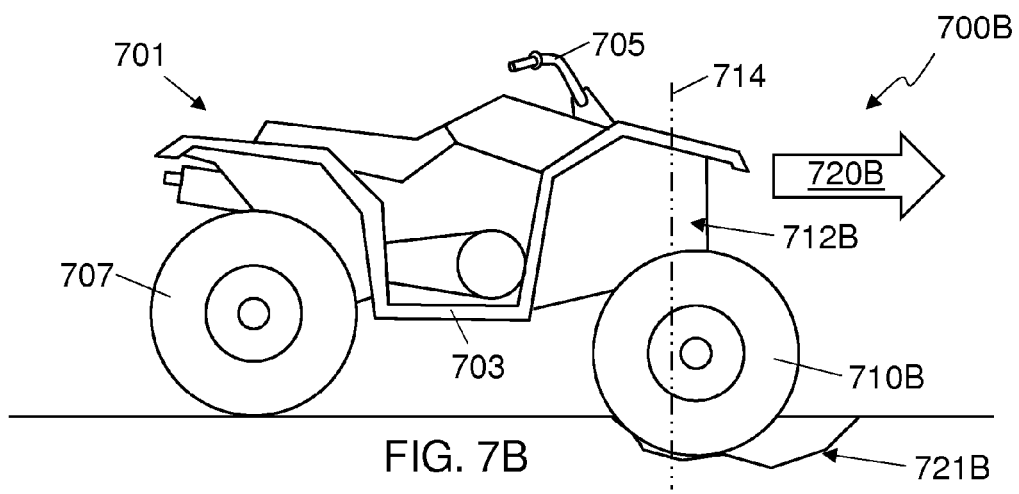
Figure 7C:
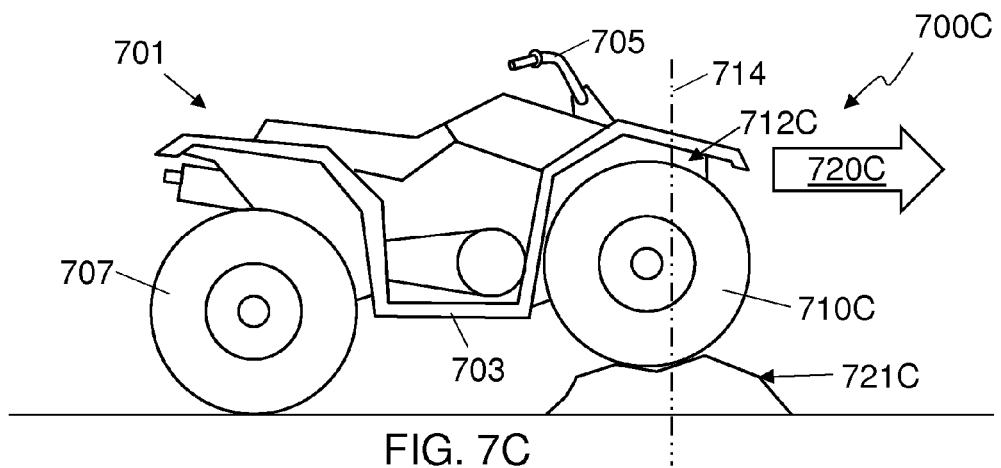

FIGS. 7A, 7B, and 7C show a wheeled vehicle 701 with an embodiment of an offset inclined suspension on level ground 721A, rolling over a hole 721B, and rolling over an bump 721C, respectively. The wheeled vehicle may be any type of vehicle with two or more wheels such as the four-wheeled all-terrain-vehicle (ATV) 701 shown. Other embodiments may include tricycles and six-wheeled vehicles. The vehicle may be an automobile, truck, pickup, or other type of wheeled vehicle, or a snowmobile in at least one embodiment. Some embodiments may include one steerable wheel attached to an offset inclined suspension, but many embodiments may include two steerable wheels with independent offset inclined suspensions mounted on opposite sides of the vehicle.

In the embodiment shown, the ATV 710 includes a chassis 703 which may be made using any technique including, but not limited to, box-frame, tubular-frame, I-beam frame, unibody, or tub construction. The ATV may have four wheels with a right front steerable wheel 710A/B/C coupled to the chassis 703 of the ATV 710 by an offset inclined suspension 712A/B/C, a right rear non-steerable wheel 707, a left front steerable wheel (not shown) coupled to the chassis 703 of the ATV 710 by another offset inclined suspension, and a right rear non-steerable wheel (not shown), although many other configurations are possible, including a single non-steerable rear wheel, steerable rear wheels, or others. The offset inclined suspension 712A/B/C may be any type of offset inclined suspension as described herein, including the offset inclined suspension 100, the offset inclined suspension 400, or the offset inclined suspension 500, but the details arc not shown in FIG. 7A/B/C for clarity. A steering mechanism, such as the handlebars 705, is included to allow a driver to turn the steerable wheel(s). Other embodiments may us a steering wheel, a tiller, or other device as the steering mechanism.

The offset inclined suspension 712A/B/C includes a support member, which may be a lower support member in some embodiments, hingedly coupled to the chassis 703 about a hinge axis that is tilted downward from forward at a hinge angle of at least about 10 degrees, and a steering spindle pivotally coupled to the support member about a steering axis that is tilted from vertical at a caster angle no larger than about 4 degrees less than the hinge angle. If the caster angle is positive, the steering axis is tilted backwards from vertical, and if the caster angle is positive, the steering axis is tilted forwards from vertical. The hinge angle can be any angle between about 5 degrees and about 60 degrees although many embodiments may use a hinge angle of between about 10 degrees and about 45 degrees. In some embodiments, the hinge angle is between about 10 degrees and about 15 degrees to configure the vehicle for on-road use, and in other embodiments, the hinge angle is between about 30 degrees and about 45 degrees to configure the vehicle for off-road use.

The steering spindle includes a stub axle to allow the wheel 710A/B/C to be mounted and allow the wheel 710A/B/C to rotate around the stub axle. The handlebars 705 are coupled to the steering spindle and configured to pivot the steering spindle about the steering axis. The handlebars 705 may also be coupled to the steering spindle of the offset inclined suspension of the left front wheel to allow the handlebars 705 to turn both front wheels in tandem. The handlebars 705 may be coupled to the steering spindle by any method to pivot the steering spindle, including, but not limited to, a rack-and-pinion mechanism, lever arms, sprockets and chains, cables and pulleys, hydraulic mechanisms, or electrical mechanisms. Other embodiments may include an upper support member with the steering spindle pivotally coupled between the upper and lower support member, or may have a steering spindle pivotally coupled between the support member and the chassis 703 with the steering spindle able to change length as the support member rotates about its hinge axis.

FIG. 7A shows the ATV 701 on level ground 721A with the offset inclined suspension 712A in a neutral position where the springs, shock absorbers, and/or other components of the suspension 712A and suspensions of the other wheels support the weight of the ATV 701. The support member(s) of the offset inclined suspension 712A in the neutral position may be approximately perpendicular to the x-z plane in some embodiments, but other embodiments may have the rotation of the control arm(s) at any angle about the hinge axis in the neutral position. A neutral position centerline 714 for the front wheel 710A may represent the position of the front wheel 710A with respect to the chassis 703 along the x-axis.

FIG. 700B shows the ATV 701 moving forward 720B as the front wheel 710B passes over an obstacle, such as a hole 721B. The front wheel 710B travels downward (−z direction) as it rolls into the hole 721B causing the offset inclined suspension 712B to extend by rotating the support member(s) downward about their hinge axis(es). Note that due to the hinge angle of the support member(s), the front wheel 710B moves forward (+x direction) from the neutral position 714 as it extends downward.

FIG. 700C shows the ATV 701 moving forward 720C as the front wheel 710C passes over an obstacle, such as a bump 721C. The front wheel 710C travels upward (+z direction) as it rolls over the bump 721 C causing the offset inclined suspension 712C to retract by rotating the support member(s) upward about their hinge axis(es). Note that due to the hinge angle of the support member(s), the front wheel 710C moves backward (−x direction) from the neutral position 714 as it retracts upward. This motion may help the offset inclined suspension react to obstacles as the front wheel 710C moves up while the ATV 701 moves forward 720C without transmitting as much shock to the chassis 703.

Figure 8:
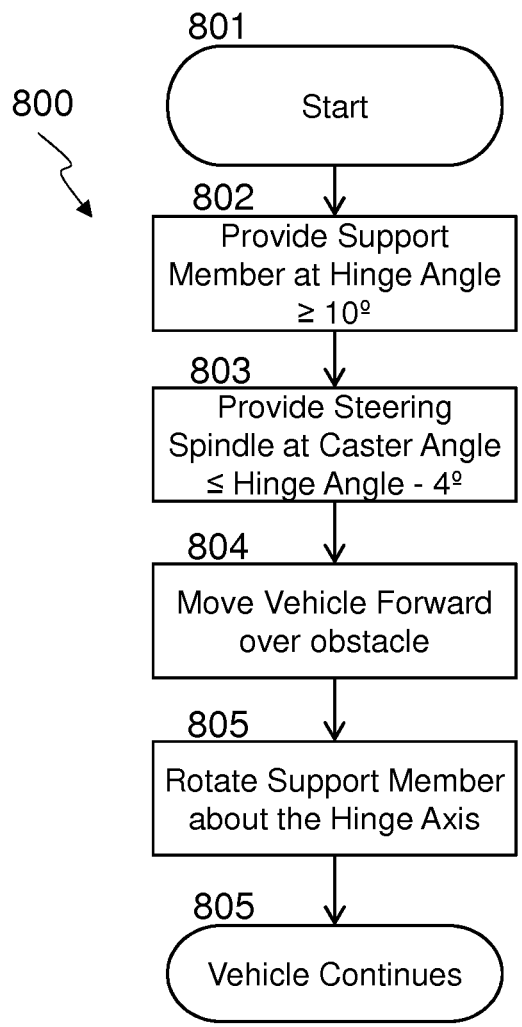
FIG. 8 shows a flowchart of an embodiment of a method of suspending a vehicle.

FIG. 8 shows a flowchart 800 of an embodiment of a method of suspending a vehicle. The method starts at block 801 and continues at block 802 by providing a support member hingedly coupled to a vehicle about a hinge axis that is tilted downward from forward at a hinge angle of at least about 10 degrees. The method continues at block 803 by providing a steering spindle including a stub axle, the steering spindle pivotally coupled to the support member about a steering axis that is tilted from vertical at a caster angle no larger than about 4 degrees less than the hinge angle. The stub axle may be rotationally coupled to a wheel or coupled to a skid.

In some embodiments, the support member is a lower support member, the hinge axis is a lower hinge axis, the hinge angle is a lower hinge angle, and the method may also include providing an upper support member hingedly coupled to the vehicle about an upper hinge axis that is tilted downward from forward at an upper hinge angle, where the steering spindle is pivotally coupled between the lower support member and the upper support member about the steering axis. In other embodiments of the method, the steering spindle is pivotally coupled between the support member and the vehicle, and the method may include changing length of the steering spindle response to the rotation of the support member about the hinge axis.

The method continues by moving the vehicle in a forward direction over an obstacle at block 804. At block 805 the method continues by rotating the support member(s) about the hinge axis to move the wheel both vertically and horizontally in response to the wheel rolling over the obstacle. The vehicle may continue on a block 805.

In some embodiments of the method, the lower hinge angle and the upper hinge angle vary by less than about 10 degrees, and in some embodiments of the method a length of the lower support member is about the same as a length of the upper support member, and the lower hinge axis is substantially parallel to the upper hinge axis. In some embodiments the hinge angle is between about 10 degrees and about 45 degrees, and the caster angle is between about 0 degrees and about ⅔ of the hinge angle.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1 and 5).

As used herein, the term "coupled" includes direct and indirect connections. Moreover, where first and second devices are coupled, intervening devices including active devices may be located there between. As used in this specification and the appended claims, the singular forms "a", "an", and "the" include plural referents unless the content clearly dictates otherwise. Thus, for example, reference to an element described as "a spring" may refer to a single spring, two springs or any other number of springs. As used in this specification and the appended claims, the term "or" is generally employed in its sense including "and/or" unless the content clearly dictates otherwise.

Additional examples of embodiments are described below.

An example offset inclined suspension apparatus includes a support member hingedly coupled to a vehicle about a hinge axis that is tilted downward from forward at a hinge angle of at least 10 degrees, and a steering spindle comprising a stub axle to mount a wheel, the steering spindle pivotally coupled to the support member about a steering axis that is tilted from vertical at a caster angle no larger than 4 degrees less than the hinge angle. In some example apparatuses, the support member is a lower support member, the hinge axis is a lower hinge axis, and the hinge angle is a lower hinge angle, the apparatus may also include an upper support member hingedly coupled to the vehicle about an upper hinge axis that is tilted downward from forward at an upper hinge angle. In some example apparatuses the steering spindle is pivotally coupled between the lower support member and the upper support member about the steering axis. In some example apparatuses the lower hinge angle and the upper hinge angle vary by less than 10 degrees. In some example apparatuses a length of the lower support member is about the same as a length of the upper support member, and the lower hinge axis is substantially parallel to the upper hinge axis. In some example apparatuses the hinge angle is between 10 degrees and 45 degrees, and the caster angle is between 0 degrees and ⅔ of the hinge angle. In some example apparatuses an axis of the stub axle is behind the steering axis. In some example apparatuses the steering spindle is pivotally coupled between the support member and the vehicle, and the steering spindle is configured to change length in response to rotation of the support member about the hinge axis. In some example apparatuses the hinge angle is between 10 degrees and 15 degrees to configure the vehicle for on-road use. In some example apparatuses the hinge angle is between 30 degrees and 45 degrees to configure the vehicle for off-road use. Any combination of the examples described in this paragraph may be combined in some embodiments.

An example wheeled vehicle includes a chassis, an offset inclined suspension as described in the previous paragraph, a first wheel rotationally coupled to the stub axle; a steering mechanism coupled to the steering spindle and configured to pivot the steering spindle about the steering axis; and at least a second wheel coupled to the chassis. Some example vehicles may also include at least one non-steerable wheel rotationally coupled to the chassis, and another offset inclined suspension as described in the previous paragraph coupled to an opposite side of the chassis from the first wheel, where the steering mechanism is coupled to the another steering spindle and configured to pivot the another steering spindle about the another steering axis to move the second wheel in tandem with the first wheel. Any combination of the examples described in this paragraph and the preceding paragraph may be combined in some embodiments.

An example method of suspending a vehicle includes providing a support member hingedly coupled to a vehicle about a hinge axis that is tilted downward from forward at a hinge angle of at least 10 degrees, providing a steering spindle comprising a stub axle to mount a wheel, the steering spindle pivotally coupled to the support member about a steering axis that is tilted from vertical at a caster angle no larger than 4 degrees less than the hinge angle, and rotationally coupled to a wheel, moving the vehicle in a forward direction over an obstacle, and rotating the support member about the hinge axis to move the wheel in both vertically and horizontally in response to the wheel rolling over the obstacle. In some example methods the support member is a lower support member, the hinge axis is a lower hinge axis, and the hinge angle is a lower hinge angle. Some example methods may also include providing an upper support member hingedly coupled to the vehicle about an upper hinge axis that is tilted downward from forward at an upper hinge angle, wherein the steering spindle is pivotally coupled between the lower support member and the upper support member about the steering axis, and rotating the upper support member about the upper hinge axis in response to the wheel rolling over the obstacle. In some example methods the lower hinge angle and the upper hinge angle vary by less than 10 degrees. In some example methods a length of the lower support member is about the same as a length of the upper support member, and the lower hinge axis is substantially parallel to the upper hinge axis. In some example methods the hinge angle is between 10 degrees and 45 degrees, and the caster angle is between 0 degrees and ⅔ of the hinge angle. In some example methods the steering spindle is pivotally coupled between the support member and the vehicle. Some example methods may include changing a length of the steering spindle response to the rotation of the support member about the hinge axis. Any combination of the examples described in this paragraph may be combined in some embodiments.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. An offset inclined suspension apparatus comprising:
   a support member hingedly coupled to a vehicle about a hinge axis that is tilted downward from forward at a hinge angle of at least 10 degrees; and
   a steering spindle comprising a stub axle to mount a wheel, the steering spindle pivotally coupled to the support member about a steering axis that is tilted from vertical at a caster angle no larger than 4 degrees less than the hinge angle.

2. The apparatus of claim 1, wherein the support member is a lower support member, the hinge axis is a lower hinge axis, and the hinge angle is a lower hinge angle, the apparatus further comprising:
   an upper support member hingedly coupled to the vehicle about an upper hinge axis that is tilted downward from forward at an upper hinge angle;
   wherein the steering spindle is pivotally coupled between the lower support member and the upper support member about the steering axis.

3. The apparatus of claim 2, wherein the lower hinge angle and the upper hinge angle vary by less than 10 degrees.

4. The apparatus of claim 2, wherein a length of the lower support member is about the same as a length of the upper support member, and the lower hinge axis is substantially parallel to the upper hinge axis.

5. The apparatus of claim 1, wherein the hinge angle is between 10 degrees and 45 degrees, and the caster angle is between 0 degrees and ⅔ of the hinge angle.

6. The apparatus of claim 1, wherein an axis of the stub axle is behind the steering axis.

7. The apparatus of claim 1, wherein the steering spindle is pivotally coupled between the support member and the vehicle; and
   the steering spindle is configured to change length in response to rotation of the support member about the hinge axis.

8. The apparatus of claim 1, wherein the hinge angle is between 10 degrees and 15 degrees to configure the vehicle for on-road use.

9. The apparatus of claim 1, wherein the hinge angle is between 30 degrees and 45 degrees to configure the vehicle for off-road use.

10. A method of suspending a vehicle, the method comprising:
    providing a support member hingedly coupled to a vehicle about a hinge axis that is tilted downward from forward at a hinge angle of at least 10 degrees;
    providing a steering spindle comprising a stub axle to mount a wheel, the steering spindle pivotally coupled to the support member about a steering axis that is tilted from vertical at a caster angle no larger than 4 degrees less than the hinge angle, and rotationally coupled to a wheel;
    moving the vehicle in a forward direction over an obstacle; and
    rotating the support member about the hinge axis to move the wheel in both vertically and horizontally in response to the wheel rolling over the obstacle.

11. The method of claim 10, wherein the support member is a lower support member, the hinge axis is a lower hinge axis, and the hinge angle is a lower hinge angle, the method further comprising:
    providing an upper support member hingedly coupled to the vehicle about an upper hinge axis that is tilted downward from forward at an upper hinge angle, wherein the steering spindle is pivotally coupled between the lower support member and the upper support member about the steering axis; and
    rotating the upper support member about the upper hinge axis in response to the wheel rolling over the obstacle.

12. The method of claim 11, wherein the lower hinge angle and the upper hinge angle vary by less than 10 degrees.

13. The method of claim 11, wherein a length of the lower support member is about the same as a length of the upper support member, and the lower hinge axis is substantially parallel to the upper hinge axis.

14. The method of claim 10, wherein the hinge angle is between 10 degrees and 45 degrees, and the caster angle is between 0 degrees and ⅔ of the hinge angle.

15. The method of claim 10, wherein the steering spindle is pivotally coupled between the support member and the vehicle, the method further comprising:
changing a length of the steering spindle response to the rotation of the support member about the hinge axis.

16. A wheeled vehicle comprising:
a chassis;
an offset inclined suspension comprising:
a support member hingedly coupled to the chassis about a hinge axis that is tilted downward from forward at a hinge angle of at least 10 degrees; and
a steering spindle comprising a stub axle, the steering spindle pivotally coupled to the support member about a steering axis that is tilted from vertical at a caster angle no larger than 4 degrees less than the hinge angle;
a first wheel rotationally coupled to the stub axle;
a steering mechanism coupled to the steering spindle and configured to pivot the steering spindle about the steering axis; and
at least a second wheel coupled to the chassis.

17. The vehicle of claim 16, wherein the support member is a lower support member, the hinge axis is a lower hinge axis, and the hinge angle is a lower hinge angle, the suspension further comprising:
an upper support member hingedly coupled to the chassis about an upper hinge axis that is tilted downward from forward at an upper hinge angle;
wherein the steering spindle is pivotally coupled between the lower support member and the upper support member about the steering axis.

18. The vehicle of claim 17, wherein the lower hinge angle and the upper hinge angle vary by less than 10 degrees.

19. The vehicle of claim 17, wherein a length of the lower support member is about the same as a length of the upper support member, and the lower hinge axis is substantially parallel to the upper hinge axis.

20. The vehicle of claim 16, wherein the hinge angle is between 10 degrees and 45 degrees, and the caster angle is between 0 degrees and ⅔ of the hinge angle.

21. The vehicle of claim 16, wherein an axis of the stub axle is behind the steering axis.

22. The vehicle of claim 16, wherein the steering spindle is pivotally coupled between the support member and the chassis; and
the steering spindle is configured to change length in response to rotation of the support member about the hinge axis.

23. The vehicle of claim 16, further comprising:
at least one non-steerable wheel rotationally coupled to the chassis; and
another offset inclined suspension coupled to an opposite side of the chassis from the first wheel, the another offset inclined suspension comprising:
another support member hingedly coupled to the chassis about a hinge axis that is tilted downward from forward at the hinge angle; and
another steering spindle comprising another stub axle rotationally coupled to the second wheel, the another steering spindle pivotally coupled to the another support member about another steering axis that is tilted from vertical at the caster angle;
wherein the steering mechanism is coupled to the another steering spindle and configured to pivot the another steering spindle about the another steering axis to move the second wheel in tandem with the first wheel.

24. The vehicle of claim 23, wherein the hinge angle is between 10 degrees and 15 degrees to configure the vehicle for on-road use.

25. The vehicle of claim 23, wherein the hinge angle is between 30 degrees and 45 degrees to configure the vehicle for off-road use.

* * * * *